United States Patent
Frank et al.

(10) Patent No.: US 7,280,705 B1
(45) Date of Patent: Oct. 9, 2007

(54) TONE CORRECTION METHOD USING A BLENDING MASK

(75) Inventors: Michael Frank, Sunnyvale, CA (US); Ricardo J. Motta, Palo Alto, CA (US)

(73) Assignee: Pixim, Inc., Mountain View, CA (US)

( * ) Notice: Subject to any disclaimer, the term of this patent is extended or adjusted under 35 U.S.C. 154(b) by 815 days.

(21) Appl. No.: 10/634,296

(22) Filed: Aug. 4, 2003

(51) Int. Cl.
*G06K 9/40* (2006.01)
*G06K 9/00* (2006.01)

(52) U.S. Cl. .................. 382/274; 382/167; 345/20; 345/63; 345/77; 345/581; 345/690; 348/254

(58) Field of Classification Search ............... 382/167, 382/274; 250/205; 345/20, 63, 77, 581–618, 345/690–697; 348/251, 254; 358/461, 518–523
See application file for complete search history.

(56) References Cited

U.S. PATENT DOCUMENTS

| | | | | |
|---|---|---|---|---|
| 5,173,950 A | * | 12/1992 | Sato et al. | 382/167 |
| 5,185,674 A | * | 2/1993 | Tai | 358/3.07 |
| 6,813,040 B1 | * | 11/2004 | Uchino et al. | 358/1.9 |
| 2002/0141640 A1 | * | 10/2002 | Kraft | 382/167 |
| 2003/0021488 A1 | * | 1/2003 | Shaw et al. | 382/260 |
| 2003/0133607 A1 | * | 7/2003 | Goto et al. | 382/162 |
| 2005/0185055 A1 | * | 8/2005 | Miller et al. | 348/207.1 |

* cited by examiner

*Primary Examiner*—Joseph Mancuso
*Assistant Examiner*—Randolph Chu
(74) *Attorney, Agent, or Firm*—Patent Law Group LLP; Carmen C. Cook

(57) ABSTRACT

A digital imaging system includes an image sensor, a frame buffer and a tone correction circuit. The tone correction circuit computes tone corrected pixel data using one or more tone correction curves. In operation, tone corrected pixel data for a first pixel is computed by generating a pixel mask for an m×n neighborhood of pixels surrounding the first pixel, applying a blending mask of weight factors to the pixel mask and computing a selector value based on the pixel mask and weight factors associated with the blending mask. The selector value is used to derive a first tone correction curve for use to compute the tone corrected pixel data for the first pixel. The first tone correction curve can be selected from the multiple tone correction curves based on the selector value or it can be derived by blending multiple tone correction curves based on the selector value.

14 Claims, 10 Drawing Sheets

TONE CORRECTION METHOD USING A BLENDING MASK

CROSS REFERENCE TO RELATED APPLICATION

This application is related to the following concurrently filed and commonly assigned U.S. patent applications: U.S. patent application Ser. No. 10/634,302, entitled "Video Imaging System Including A Digital Image Sensor and A Digital Signal Processor," of Michael Frank et al.; and U.S. patent application Ser. No. 10/634,338, entitled "Image Processor with Noise Reduction Circuit," of Michael Frank. The aforementioned patent applications are incorporated herein by reference in their entireties.

FIELD OF THE INVENTION

The invention relates to a tone correction method and, in particular, to a method for applying tone correction in a digital imaging system using a blending mask.

DESCRIPTION OF THE RELATED ART

A digital imaging system for still or motion images uses an image sensor or a photosensitive device that is sensitive to a broad spectrum of light to capture an image of a scene. The photosensitive device reacts to light reflected from the scene and can translate the strength of that light into electronic signals that are digitized. Generally, an image sensor includes a two-dimensional array of light detecting elements, also called pixels, and generates electronic signals, also called pixel data, at each light detecting element that are indicative of the intensity of the light impinged upon each light detecting element. Thus, the sensor data generated by an image sensor is often represented as a two-dimensional array of pixel data.

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy, reduce power consumption, and improves overall system performance.

In the DPS array of the '425 patent, the analog-to-digital conversion (ADC) is based on first order sigma delta modulation. While this ADC approach requires fairly simple and robust circuits, it has the disadvantages of producing too much data and suffering from poor low light performance. U.S. Pat. No. 5,801,657 of B. Fowler et al. describes a Multi-Channel Bit Serial (MCBS) analog-to-digital conversion technique which can be advantageously applied in a digital pixel sensor for performing massively parallel analog-to-digital conversions. The MCBS ADC technique of the '657 patent can significantly improve the overall system performance while minimizing the size of the ADC circuit. Furthermore, as described in the '657 patent, a MCBS ADC has many advantages applicable to image acquisition and more importantly, facilitates high-speed readout. The aforementioned patents are incorporated herein by reference in their entireties.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

Conventional imaging systems are usually built using separate integrated circuits for the different components constituting the imaging system. Thus, the image acquisition component including the image sensor and the supporting circuitry may be built on one integrated circuit while the image processing component including a signal processing unit may be built on another integrated circuit. As a result of using separate integrated circuits, noise generated in one component does not coupled easily to other components of the imaging system. This is because noise coupling generally occurs through the power supply lines within an integrated circuit or through the substrate on which the integrated circuit is built. As the components are separate, noise generated in one integrated circuit does not couple easily to another integrated circuit.

A digital imaging system generally includes an image acquisition component and an image processing component. The image acquisition component includes the photosensitive device and the image processing component includes logic circuitry or a digital signal processor (DSP) for processing the digital pixel data generated by the photosensitive device. Sometimes, it is desirable to provide a system on a chip (SOC) image sensor where all the electronics for a complete imaging system are included in an integrated circuit. An SOC image sensor may include a sensor array, supporting readout circuitry, analog-to-digital conversion (ADC) circuitry, and image processing circuitry.

However, there are obstacles in developing a fully integrated SOC image sensor. For example, CMOS image sensors typically suffer from temperature dependent dark current that reduces the signal to noise ratio of the image sensor and limits the sensitivity of the imaging system. To reduce dark current, it is necessary to reduce the power consumption of the image sensor. However, signal processing circuits typically consume a significant amount of power. Therefore, dark current can be a particular problem in an SOC image sensor where large amount of image processing circuitry are incorporated with the image sensor.

Second, when the image sensor is fabricated on an integrated circuit, usually the image sensor can use only four metal layers to keep the micro lenses, built on the top surface of the metal layers, and the photodiodes, built in the silicon substrate, at a reasonable distance. However, the complexity of the image processing circuitry often requires at least 6 metal layers to implement to achieve the desired level of cost efficiency and signal and power distribution. Thus, it is difficult and sometimes prohibitive to integrate an image sensor with complex processing circuitry.

Other obstacles exist in providing a SOC image sensor. Therefore, it is desirable to provide an imaging system capable of high degree of integration while preserving high quality imaging capabilities.

SUMMARY OF THE INVENTION

According to one embodiment of the present invention, a video imaging system includes a digital image sensor for performing image capture operations and a digital image processor for performing image processing operations whereby the digital image sensor and the digital image processor communicate using digital signals only.

The digital image sensor includes a sensor array having a two-dimensional array of digital pixels where each digital pixel outputs digital signals as pixel data representing an image of a scene. The digital image sensor further includes an image buffer, in communication with the sensor array, for storing the pixel data, a first processor, in communication with the image buffer and the sensor array, for controlling image capture and pixel data processing operations, and a first interface circuit, in communication with the image buffer, for transferring the pixel data onto a pixel bus.

The digital image processor includes a second interface circuit coupled to receive the pixel data from the pixel bus, a frame buffer, in communication with the second interface circuit, coupled to store the pixel data, an image processing pipeline for processing the pixel data stored in the frame buffer into video data corresponding to a video format selected from a group of video formats, and a second processor, in communication with the frame buffer and the video image processing circuit, for directing the video image processing circuit to process the pixel data stored in the frame buffer.

In operation, the digital image sensor and the digital image processor transfer control information over a control interface bus and the digital image sensor performs the image capture operations independent of the image processing operations performed by the digital image processor.

According to another aspect of the present invention, a digital imaging system includes an image sensor, an interface circuit, a frame buffer and an image processor. The image sensor includes a two-dimensional array of pixel elements where the image sensor outputs digital signals on a pixel bus as pixel data representing an image of a scene. The interface circuit is coupled to receive the pixel data from the pixel bus. The frame buffer is in communication with the interface circuit and is coupled to store pixel data provided by the interface circuit. Finally, the image processor operates to process the pixel data stored in the frame buffer to generate image data for displaying the image of the scene. In particular, the interface circuit includes a noise reduction circuit operated to perform signal processing on the pixel data received on the pixel bus for noise reduction. In this manner, random noise such as readout noise can be eliminated as pixel data are being transferred from the image sensor and stored in the frame buffer.

According to yet another aspect of the present invention, a digital imaging system includes an image sensor, a frame buffer and a tone correction circuit. The image sensor includes a two-dimensional array of pixel elements where the image sensor outputs digital signals as pixel data representing an image of a scene. The frame buffer is in communication with the image sensor and is coupled to store the pixel data provided by the image sensor. The tone correction circuit is coupled to receive pixel data from the frame buffer and compute tone corrected pixel data using one or more tone correction curves. In operation, the tone correction circuit computes tone corrected pixel data for a first pixel by generating a pixel mask for an m×n neighborhood of pixels surrounding the first pixel, applying a blending mask of weight factors to the pixel mask and computing a selector value based on the pixel mask and weight factors associated with the blending mask. The selector value is used to derive a first tone correction curve for use to compute the tone corrected pixel data for the first pixel.

In one embodiment, the first tone correction curve is selected from the one or more tone correction curves based on the selector value. In another embodiment, the first tone correction curve is a complex tone correction curve derived by blending a first one and a second one of the one or more tone correction curves based on the selector value.

The present invention is better understood upon consideration of the detailed description below and the accompanying drawings.

DETAILED DESCRIPTION OF THE PREFERRED EMBODIMENTS

In accordance with the principles of the present invention, a video imaging system includes a digital image sensor and a digital image processor. The digital image sensor is implemented as a digital pixel sensor for providing high quality images with enhanced dynamic range. The digital image processor implements signal processing functions, such as for generating video images in a number of video formats and for providing image enhancement functions. The video imaging system also incorporates various noise reduction and image enhancement techniques for ensuring high quality video image output. Specifically, the video imaging system includes a noise reduction circuit for reducing random additive noise, such as readout noise, and enhancing video image quality at low light conditions. The video imaging system also implements a tone correction technique using blending masks and an algorithm for subtracting fixed pattern noise.

In one application, the video imaging system of the present invention is integrated in a digital video camera system for providing high quality video images with enhanced dynamic range. The video imaging system of the present invention has particular applications in closed-circuit-television and in security cameras where high dynamic range images are desired.

In one embodiment, the video imaging system of the present invention is formed as two integrated circuits. That is, the video imaging system includes a digital image sensor chip and a digital image processor chip. A fully digital communication interface is provided to permit high speed and high fidelity data transfer between the digital image sensor and the digital signal processor. The digital image sensor can be operated autonomously. That is, image capture is carried out by the digital image sensor completely independently of the digital image processor. The digital image sensor delivers only complete image data to the digital signal processor. The video imaging system includes two memory circuits for storing the image data. Specifically, an image buffer is included in the digital image sensor for storing the image data of each captured image and a frame buffer in the digital image processor for storing the image data from the image sensor for processing. Because a second memory circuit is included, the video imaging system of the present invention can perform temporal filtering of the image data using the second memory circuit (the frame buffer) to improve image quality. These and other features of the video imaging system of the present invention will be described in more detail below.

System Overview

Figure 1:
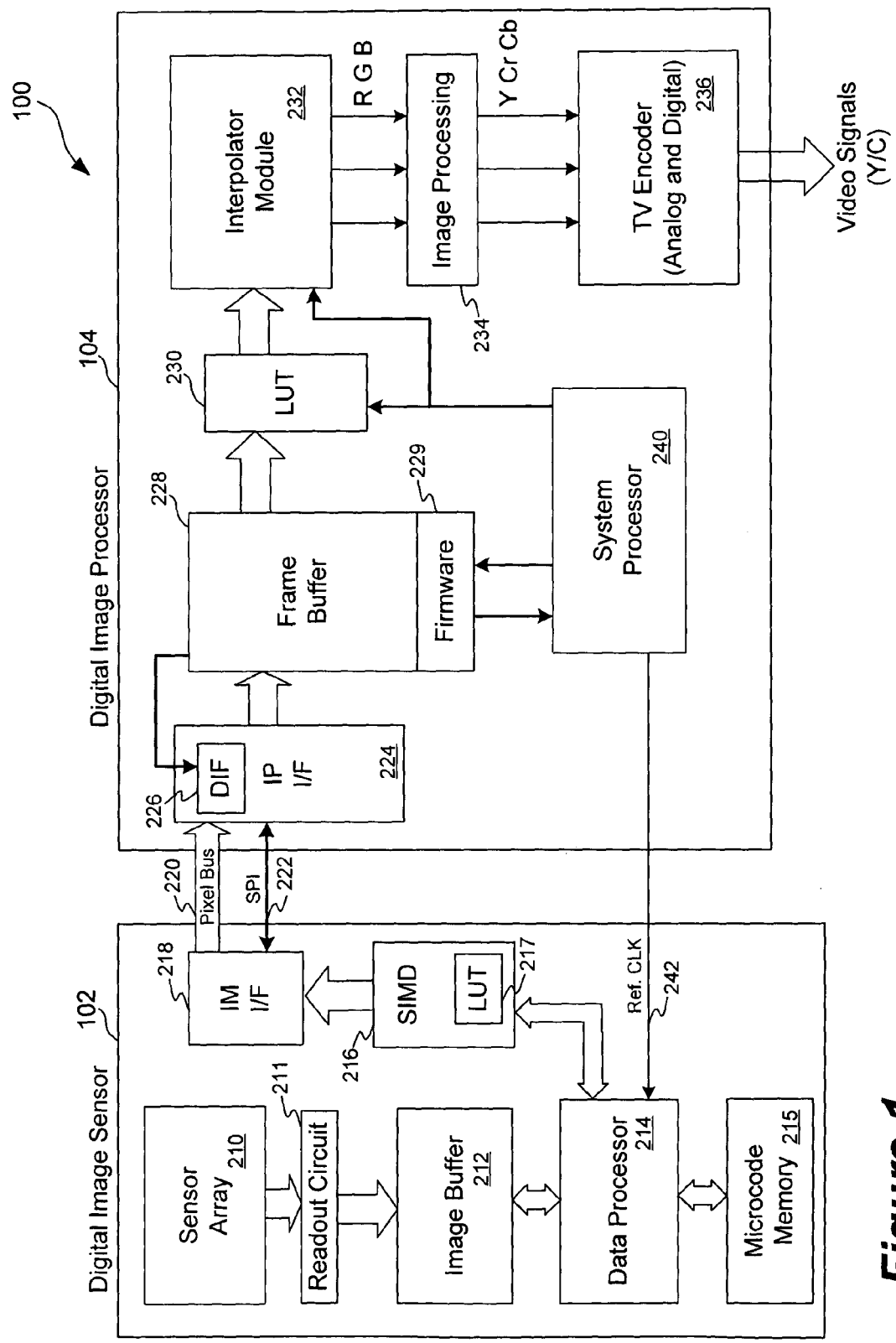
FIG. 1 is a block diagram of a video imaging system according to one embodiment of the present invention.

FIG. 1 is a block diagram of a video imaging system according to one embodiment of the present invention. Referring to FIG. 1, video imaging system 100 includes a digital image sensor subsystem 102 and a digital image processor subsystem 104. Digital image sensor subsystem 102 and digital image processor subsystem 104 can be formed on a single integrated circuit or each subsystem can be formed as an individual integrated circuit. In other embodiments, the digital image sensor subsystem and the digital image processor subsystem can be formed as a multi-chip module whereby each subsystem is formed as separate integrated circuits on a common substrate.

In one embodiment, digital image sensor subsystem 102 and digital image processor subsystem 104 are formed as two separate integrated circuits. Forming the digital image sensor subsystem on a separate integrated circuit from the digital image processor enables the use of fabrication processes that are specifically tailored for each subsystem. For example, a four or less metal layer fabrication process can be used to form the digital image sensor subsystem to improve light collection while a six or more metal layer process can be used to form the digital image processor subsystem to improve integration. Furthermore, limiting the amount of signal processing circuitry on the image sensor has the advantage of achieving lower power consumption, lower noise and therefore reduced dark current effect in the image sensor integrated circuit. In sum, it is possible to form video imaging system 100 of the present invention in one or more integrated circuit depending on the application and the amount of integration desired for each integrated circuit. In the present description, the terms "digital image sensor 102" and "digital image processor 104" will be used to refer to the respective subsystems of video imaging system 100. The use of the terms "digital image sensor 102" and "digital image processor 104" are not intended to limit the implementation of the video imaging system of the present invention to two integrated circuits, one for each subsystem.

Digital image sensor 102 is an operationally "stand-alone" imaging subsystem and is capable of capturing and recording image data independent of digital image processor 104. Digital image sensor 102 operates to collect visual information in the form of light intensity values using an area image sensor, such as sensor array 210, which includes a two-dimensional array of light detecting elements, also called photodetectors. Sensor array 210 collects image data under the control of a data processor 214. At a predefined frame rate, image data collected by sensor array 210 are read out of the photodetectors through readout circuit 211 and stored in an image buffer 212. Typically, image buffer 212 includes enough memory space to store at least one frame of image data from sensor array 210. Digital image sensor 102 may further include a memory 215 for storing microcode instructions used by data processor 214. In another embodiment, memory 215 can be formed as part of image buffer 212 whereby memory space is allocated in image buffer 212 for storing the microcodes.

Digital image sensor 102 further includes an image processing unit which in the present embodiment is implemented as a single-instruction-multiple-data (SIMD) engine 216. SIMD engine 216 includes a programmable lookup table 217 which lookup table can be programmed by data processor 214. SIMD engine 216 can be used to provide preliminary processing of the image data stored in image buffer 212, such as linearization of the image data from Gray code to binary format.

Image data recorded by digital image sensor 102 is transferred through an image sensor interface circuit (IM I/F) 218 to digital image processor 104. In the present embodiment, digital image sensor 102 and digital image processor 104 communicate over a pixel bus 220 and a serial peripheral interface (SPI) bus 222. Pixel Bus 220 is uni-directional and serves to transfer image data from digital image sensor 102 to digital image processor 104. SPI bus 222 is a bi-directional bus for transferring instructions between the digital image sensor and the digital image processor. In video imaging system 100, the communication interface between digital image sensor 102 and digital image processor 104 is a purely digital interface. Therefore, pixel bus 220 can implement high speed data transfer allowing real time display of images captured by image sensor 102.

In one embodiment, pixel bus 220 is implemented as a low-voltage differential signalling (LVDS) data bus. By using a LVDS data bus, very high speed data transfer can be implemented. Furthermore, in one embodiment, SPI bus 222 is implemented as a four-wire serial communication and serial flash bus. In other embodiments, SPI bus 222 can be implemented as a parallel bi-directional control interface.

Digital image processor 104 receives image data from digital image sensor 102 on pixel bus 220. The image data is received at an image processor interface circuit (IP I/F) 224 and stored at a frame buffer 228. Digital image processor 104, operating under the control of system processor 240, performs digital signal processing functions on the image data to provide video signals in the desired video format.

Depending on the video format selected, the image data stored in frame buffer 228 is processed into video data in the desired video format through the operation of an interpolator module 232. The desired video format can be selected in a variety of ways, such as by accepting an input from the user through a mode select signal. In the present embodiment, interpolator module 232 is implemented in accordance with commonly assigned and copending U.S. patent application Ser. No. 10/174,868, entitled "A Multi-Standard Video Image Capture Device Using A Single CMOS Image Sensor," of Michael Frank and David Kuo, filed Jun. 16, 2002 (the '868 application), which application is incorporated herein by reference in its entirety. Specifically, interpolator module 232 performs vertical interpolation of the image data and either upsamples or downsamples to generate video data having the desired vertical resolution. For color applications, interpolator module 232 also performs color interpolation ("demosaicing") to generate full color video data. In one embodiment of the present invention, interpolator module 232 performs demosaicing and vertical interpolation in separate operations. In another embodiment of the present invention, interpolator module 232 performs both the demosaicing and vertical interpolation operations in one combined operation, thereby reducing the computational burden and time required to process the image data.

Interpolator Module 232 generates full color video data in the selected video format which are then provided to image processing circuit 234 for further processing, such as tone correction. Then, the full color video data is provided to a TV encoder 236 to be encoded as video signals (or TV signals) for the selected television standard. TV encoder 236 can encode video data into analog or digital television signals.

Digital image processor 104 also includes a programmable lookup table 230 coupled between frame buffer 238 and interpolator module 232. Lookup table 230 can be programmed by system processor 240 to implement a variety of image processing functions, including but not limited to defective or dead pixel correction and privacy masking. The use of a programmable lookup table in an image sensor, such as lookup table 217 and lookup table 230, to provide image processing functions is described in detail in copending and commonly assigned U.S. patent application Ser. No. 10/634,339, entitled "Digital CMOS Image Sensor Incorporating A Programmable Multi-Functional Lookup Table," of David Yang et al., filed Aug. 4, 2003, which application is incorporated herein by reference in its entirety.

The encoded video signals generated by TV encoder 236 can be used in any number of ways depending on the application. For example, the signals can be provided to a television set for display. The encoded video signals can also be fed to a video recording device to be recorded on a video recording medium. When video imaging system 100 is a video camcorder, the TV signals can be provided to a viewfinder on the camcorder.

In operation, TV encoder 236 drives digital image processor 104 backward by transmitting control signals to interpolator module 232 specifying the line number and the display field (odd or even) for which video signals are to be processed. In response, interpolator module 232 generates full color video data in the selected format for the line number and the display field specified. For example, when the NTSC standard is selected, interpolator module 232 will generate video data having a vertical resolution of 240 lines per field. When the PAL standard is selected, interpolator module 232 will generate video data having a vertical resolution of 288 lines per field.

In the present description, video imaging system 100 generates video signals in either the NTSC video format or the PAL video format. However, this is illustrative only and in other embodiments, video imaging system 100 can be configured to support any video formats, including digital television, and any number of video formats, as long as interpolator module 232 is provided with the appropriate interpolation coefficients, as described in details in the aforementioned '868 application.

The video imaging system of the present invention offers numerous advantages not realized in conventional imaging devices. First, the video imaging system utilizes a fully digital communication interface for providing high speed, high quality communication between the digital image sensor and the digital image processor. Thus, each frame of image data captured by digital image sensor 102 can be coupled to digital image processor 104 for processing to provide real-time video images.

Second, video imaging system 100 includes image buffer 212 in the digital image sensor and frame buffer 228 in the digital image processor. By providing a frame buffer in addition to an image buffer, the video imaging system of the present invention can perform temporal filtering of the image data using the second memory circuit (the frame buffer) to improve image quality.

Third, the video imaging system of the present invention provides multi-standard capability, allowing a single imaging device to be used to capture video images to be displayed in any number of television standards. In essence, a user of the video imaging system of the present invention can capture video images and display or record the images in any or all of the television standards. The multi-standard capability of the video imaging system of the present invention provides convenience and ease of use not attainable in conventional video imaging devices.

The detail structure and operation of video imaging system 100 will now be described with reference to the detailed block diagram of the video imaging system in FIG. 1.

Digital Image Sensor

Digital image sensor 102 handles the image capture functions in video imaging system 100 and operates autonomously to generate pixel data indicative of the scenes being captured. That is, digital image sensor 102 operates independently to perform image capture and pixel data storage which image capture and data storage operations are triggered by digital image processor 104 but are operated without intervention from the digital image processor. Digital image sensor 102 and digital image processor 104 communicate via a four-signal protocol where digital image process 104 requests a frame of image and digital image sensor acknowledges when the image capture operation for a frame is completed and when pixel data are available in image buffer 212 for retrieval.

As described above, video imaging system 100 uses a single image sensor to capture video images which are then processed into video data in any video formats. Specifically, digital image sensor 102 includes a sensor array 210 of light detecting elements (also called pixels) and generates digital pixel data as output signals at each pixel location. Digital image sensor 102 also includes image buffer 212 for storing at least one frame of digital pixel data from sensor array 210 and data processor 214 for controlling the capture and readout operations of the image sensor. Data processor 214 also directs SIMD engine 216 to perform image processing operations, such as normalization of pixel data captured using multiple sampling.

Digital image sensor 102 also includes other circuitry to support the image capture and readout operations of the image sensor. As illustrated in FIG. 1, digital image sensor 102 includes readout circuit 211 for facilitating the readout of pixel data from sensor array 210. For instance, readout circuit 211 can include sense amplifiers and other control circuits for reading the pixel data from sensor array 210 in a predefined order. Digital image sensor 102 may include other circuits, such as row and column address decoders (not shown) for facilitating the accessing of the array of photodetectors. The digital pixel data (or image data) captured by sensor array 210 is read by the readout circuit and stored in image buffer 212 which is local (i.e., on the same integrated circuit) to sensor array 210.

In the present embodiment, image sensor 102 is a digital image sensor implemented as a digital pixel sensor (DPS), that is a CMOS image sensor with pixel level analog-to-digital conversion capabilities. A CMOS image sensor with pixel level analog-to-digital conversion is described in U.S. Pat. No. 5,461,425 of B. Fowler et al. (the '425 patent), which patent is incorporated herein by reference in its entirety. A digital pixel sensor provides a digital output signal at each pixel element representing the light intensity value detected by that pixel element. The combination of a photodetector and an analog-to-digital (A/D) converter in an area image sensor helps enhance detection accuracy, reduce power consumption, and improves overall system performance.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 2 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 2:
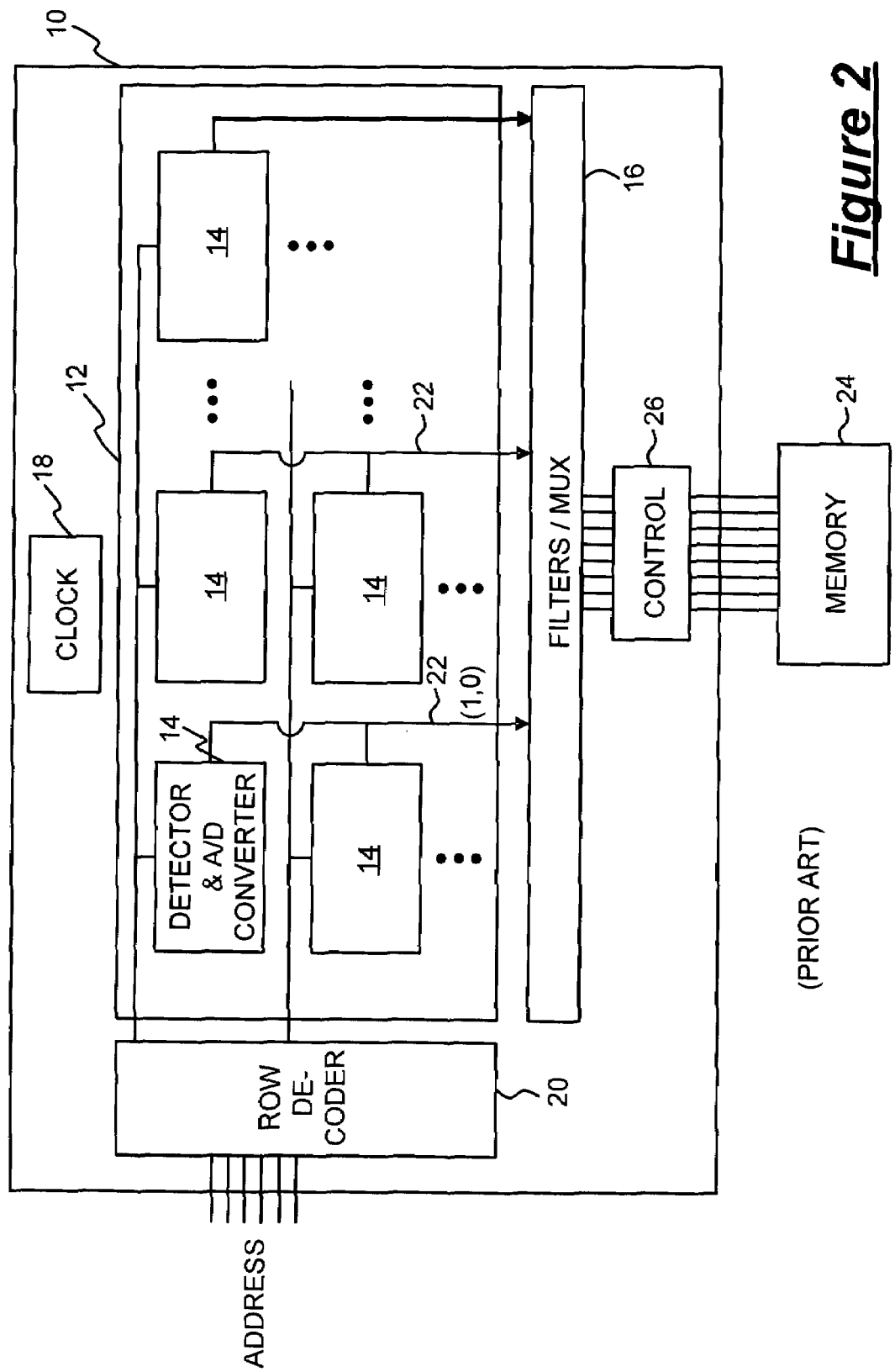
FIG. 2 is a block diagram of a digital image sensor as described in U.S. Pat. No. 5,461,425 of Fowler et al.

In the digital pixel sensor architecture shown in FIG. 2, a dedicated ADC scheme is used. That is, each of pixel elements 14 in sensor array 12 includes an ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetectors by multiplexing between the four photodetectors. The shared ADC architecture retains all the benefits of a pixel level analog-to-digital conversion while providing the advantages of using a much smaller circuit area, thus reducing manufacturing cost and improving yield. Above all, the shared ADC architecture allows a higher fill factor so that a larger part of the sensor area is available for forming the photodiodes.

In one embodiment of the present invention, the ADC circuit of each digital pixel or each group of digital pixel is implemented using the Multi-Channel Bit Serial (MCBS) analog-to-digital conversion technique described in U.S. Pat. No. 5,801,657 of B. Fowler et al. (the '657 patent), which patent is incorporated herein by reference in its entirety. The MCBS ADC technique of the '657 patent can significantly improve the overall system performance while minimizing the size of the ADC circuit. Furthermore, as described in the '657 patent, a MCBS ADC has many advantages applicable to image acquisition and more importantly, facilitates high-speed readout.

In another embodiment of the present invention, the ADC circuit of each digital pixel or each group of digital pixel implements a thermometer-code analog-to-digital conversion technique with continuous sampling of the input signal for achieving a digital conversion with a high dynamic range. A massively parallel thermometer-code analog-to-digital conversion scheme is described in copending and commonly assigned U.S. patent application Ser. No. 10/185,584, entitled "Digital Image Capture having an Ultra-high Dynamic Range," of Justin Reyneri et al., filed Jun. 26, 2002, which patent application is incorporated herein by reference in its entirety.

The use of a DPS in image sensor 102 has advantages over other imaging devices in that a very large dynamic range in image capture can be achieved. More importantly, the high dynamic range image can be maintained throughout the interpolation process such that the resultant video data can have a high dynamic range, regardless of the video format.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

Figure 3:
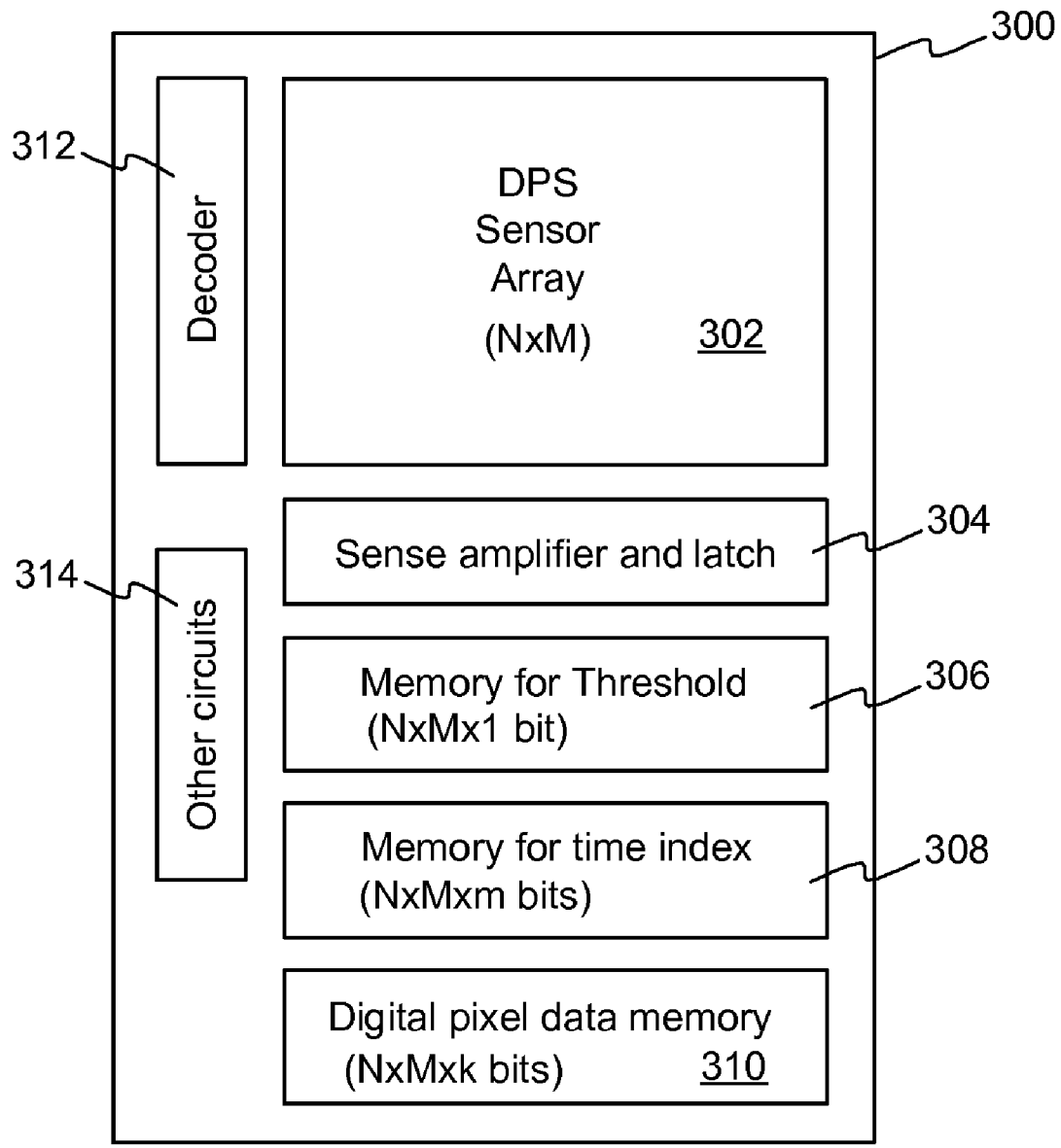
FIG. 3 is a functional block diagram of an image sensor as described in U.S. patent application Ser. No. 09/567,786.

FIG. 3 duplicates FIG. 3 of the '786 patent application and shows a functional block diagram of an image sensor 300 which may be used to practice the method of the present invention. The operation of image sensor 300 using multiple sampling is described in detail in the '786 patent application. Image sensor 300 includes a DPS sensor array 302 which has an N by M array of pixel elements. Sensor array 302 employs either the dedicated ADC scheme or the shared ADC scheme and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. The exposure time indicating when the light intensity measured by each pixel has passed the threshold level is stored in time index memory 308. As a result of this memory configuration, each pixel element in sensor array 302 can be individually time-stamped by threshold memory 306 and time index memory 308 and stored in digital pixel data memory 310. A DPS image sensor employing multiple sampling and MCBS analog-to-digital conversion described above is capable of recording 14 to 16 or more bits of dynamic range in the captured image, in contrast with the 10 bits of dynamic range attainable by conventional image sensors. In the present embodiment, digital image sensor 102 is a DPS image sensor and is implemented in the same manner as image sensor 300 of FIG. 3 to support multiple sampling for attaining a high dynamic range in image capture.

Figure 4:
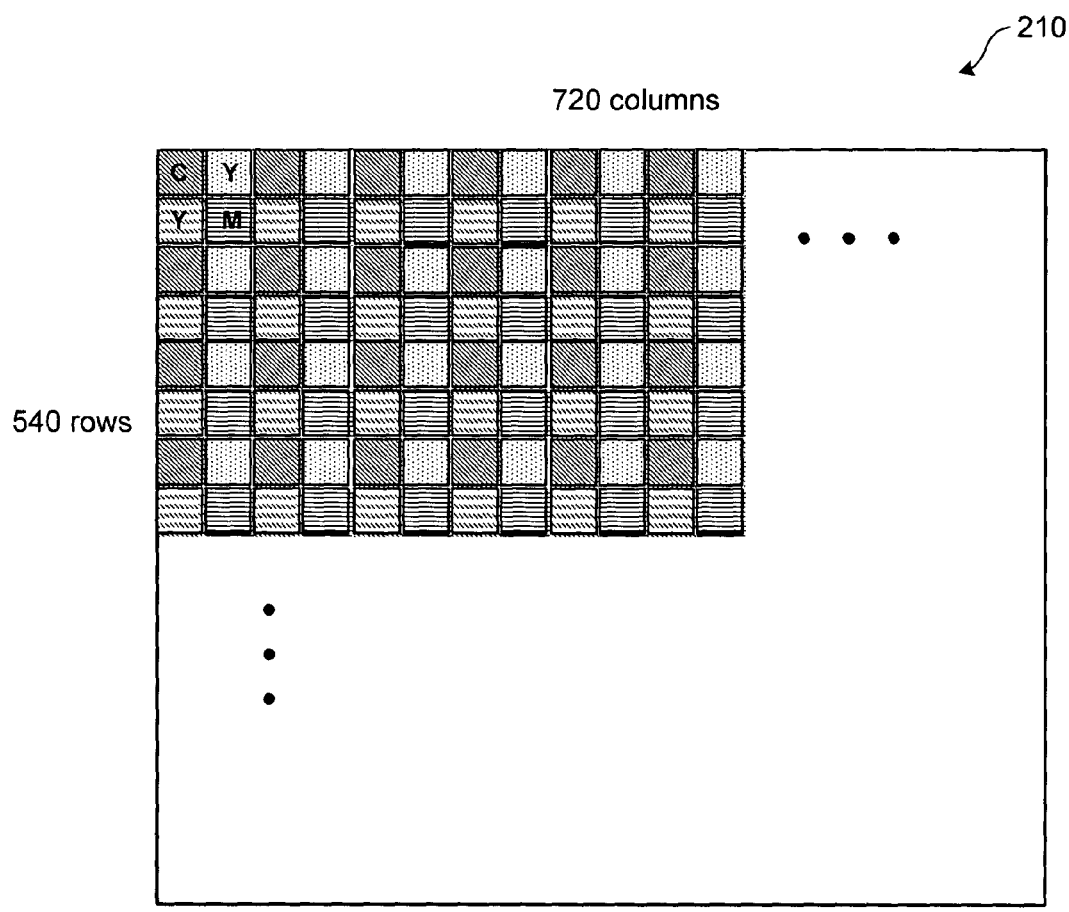
FIG. 4 illustrates a color imaging array which can be used to implement the sensor array in the digital image sensor of FIG. 1 according to one embodiment of the present invention.

FIG. 4 illustrates a color imaging array which can be used to implement sensor array 210 according to one embodiment of the present invention. Referring to FIG. 4, sensor array 210 includes N rows and M columns of photodetectors. Thus, sensor array 210 has a resolution of N×M pixels. For color applications, sensor array 210 includes a mosaic of selectively transmissive filters superimposed and in registration with each of the photodetectors in the array so that multiple groups of photodetectors are made to sense different color spectrum of the visible light. In the present embodiment, sensor array 210 uses a "Bayer pattern" including individual luminance and chrominance sensing elements. In FIG. 4, sensor array 210 is implemented using a four-color Bayer pattern including a cyan, magenta, and two yellow (CMY) sensing elements overlaying a block of 2×2 pixels. The four-color Bayer pattern is repeated throughout sensor array 210 so that each pixel is disposed to sample only one color component of the scene. Pixel values for other color components are missing at each pixel location. To obtain a full color image, an interpolation process (also called "demosaicing") is performed amongst the neighboring pixels to determine the interpolated pixel values at each pixel location for the missing color components. The color interpolation process in video imaging system 100 will be described in more detail below.

In the present embodiment, in order to support both the NTSC and PAL video format, sensor array 210 is configured to include 720 pixels in the horizontal direction (i.e., 720 columns) and 540 pixels in the vertical direction (i.e., 540 rows). In the present embodiment, each of the pixels in image sensor 102 is a square pixel. That is, the pixels of sensor array 210 each have a 1:1 aspect ratio. As thus configured, sensor array 210 is well suited for television display which uses a 4:3 aspect ratio.

In the NTSC video format, a full frame video image has 720 active pixels in the horizontal direction and 525 active pixels in the vertical direction. On the other hand, for the PAL video format, a full frame video image has 720 active pixels in the horizontal direction and 625 active pixels in the vertical direction. Thus, in the present embodiment, sensor array 210 is configured to have the same horizontal resolution as the NTSC and PAL video formats but an intermediate vertical resolution as compared to the NTSC and PAL video formats. In this manner, image data captured by sensor array 210 can be converted to either the NTSC standard or the PAL standard by interpolating (or scaling) pixel data along the vertical direction only. Specifically, pixel data captured by sensor array 210, having a vertical resolution of 540 pixels, is downsampled to obtain image data in the NTSC video format (240 lines per display field) (or the PAL video format (288 lines per display field). Because no horizontal interpolation is needed, the image quality of the final video images can be greatly improved. The operation of interpolator module 232 in upsampling or downsampling image data from digital image sensor 102 is described in detail in aforementioned '868 application and will not be further described.

The 720×540 resolution of sensor array 210 selected for the present embodiment is illustrative only. In other embodiments, the sensor array can have other resolution suitable for the television standards to be supported. Also, the resolution of the image sensing array can be selected to maintain compatibility with existing, cost effective optical systems. For example, in the present embodiment, the 720×540 resolution in combination with the specific pixel size of sensor array 210 results in an image sensor with a 6 mm diagonal dimension which is compatible with existing optical systems.

In the present embodiment, digital image sensor 102 implements correlated double sampling for noise reduction. Correlated double sampling (CDS) is an image processing technique employed to reduce kT/C or thermal noise and 1/f noise in an image sensor array. CDS can also be employed to compensate for any fixed pattern noise or variable comparator offset. To implement CDS, the sensor array is reset and the pixel values at each photodetector is measured and stored in specified memory locations in the data memory. The pixel value measured at sensor array reset is called "CDS values" or "CDS subtract values." Subsequently, for each frame of pixel data captured by the sensor array, the stored CDS values are subtracted from the measured pixel intensity values to provide normalized pixel data free of errors caused by noise and offset.

In accordance with one embodiment of the present invention, digital image sensor 102 implements CDS by storing the CDS values for each pixel in specific locations in image buffer 212. Specifically, image buffer 212 stores k bits of pixel data for each pixel. The k-bit pixel data is partitioned and part of the k-bit is used for storing the measured pixel intensity value and the remaining part used for storing the CDS value. In one embodiment, a dedicated number of bits are allotted for storing the CDS values. In another embodiment, the number of bits per each pixel data that is allocated for storing CDS values is varied by programming lookup table 217.

In one embodiment of the present invention, CDS subtraction is implemented in digital image sensor 102 using SIMD engine 216 in conjunction with programmable lookup table 217. In the present embodiment, SIMD engine 216 also performs other preliminary image processing functions on the pixel data. Specifically, sensor array 210 outputs pixel data in Gray code and in a bitplane format. In the bitplane format, sensor array 210 outputs a bit, such as the least significant bit, for all the pixels first and then outputs the next bit for all the pixels. To be useful, the pixel bits need to be rearranged in pixel-bit format, that is, all bits of the pixel data for a pixel are adjacent to each other and the pixel data needs to be converted to binary representation. In the present embodiment, SIMD engine 216 performs the Gray code to binary conversion and pixel bit rearrangement so that pixel data provided to interface circuit 218 are linearized in binary representation and arranged in pixel-bit format. For color application, SIMD engine 216 provides pixel data as linear, CDS corrected CMY pixel data to be sent to digital image processor 104 for processing.

In another embodiment, SIMD engine 216 also performs a companding operation where by pixel values of bright intensity values are compressed. The use of companding in a digital image sensor is described in commonly assigned U.S. patent application Ser. No. 09/823,843, entitled "Method and Apparatus for Companding Pixel Data in a Digital Pixel Sensor," by Justin Reyneri and Benjamin P. Olding, filed Mar. 30, 2001, which application is incorporated herein by reference in its entirety.

Interface circuit 218 in digital image sensor 102 handles the transfer of pixel data and control signals in the form of microcodes to and from digital image processor 104. In one embodiment, interface circuit 218 includes a pixel bus interface module and an SPI bus interface module. The pixel bus interface module serves two major functions. First, the pixel bus interface module synchronizes the pixel data provided by SIMD engine 216 to the data transfer rate of pixel bus 220. In one embodiment, SIMD engine 216 generates pixel data at 100 MHz while pixel bus 220 transfers data at a double data rate of 200 MHz. The pixel bus interface module in interface circuit 218 operates to synchronize the pixel data. Second, the pixel bus interface module performs other data flow control functions between SIMD engine 216 and digital image processor 104. As described above, pixel bus 220 can be implemented as a low voltage differential signalling data bus to enable high speed transfer. In that case, the pixel bus interface module operates to convert the pixel data to differential signals.

The SPI bus interface module of interface circuit 218 interprets the control signals received on SPI bus 222 and forwards the control signals to the respective modules in digital image sensor 102. In operation, SIMD engine 216, data processor 214, image buffer 212 may all receive control signals via the SPI bus. Furthermore, the SPI bus interface module operates to load registers in digital image sensor 102 with image capture information and to query the status of key signals within the image sensor, such as SIMD processing complete, and sensor running. The SPI bus interface module follows a four-signal protocol including commands for sensor enable, serial output data, input data and serial clock.

Digital image sensor 102 receives a reference clock on bus 242 from digital image processor 104. The reference clock generates all clocking signals for the digital image sensor. Specifically, data processor 214 may include a phase-lock-loop (PLL) and a clock divider circuit for generating the various clock signals required by the image sensor.

In some embodiments, digital image sensor 102 implements several measures for reducing power consumption and noise coupling into the analog circuitry. The measures include turning off the system clock during analog-to-digital conversion for noise reduction, turning off the clock when no image capture is being performed for reducing power consumption, and turning off the clock driving lookup table 217 when not in use.

Digital Image Processor

Digital image processor 104 is a high performance image processor for processing pixel data from digital image sensor 102 into video images in a desired video format. In the present embodiment, digital image processor 104 implements signal processing functions for supporting an entire video signal processing chain. Specifically, the image processing functions of digital image processor 104 include demosaicing, image scaling, and other high-quality video enhancements, including color correction, edge, sharpness, color fidelity, backlight compensation, contrast, and dynamic range extrapolation. The image processing operations are carried out at video rates. In the present embodiment, digital image processor 104 also includes a histogram engine to capture histogram data for the incoming pixel data. In addition, digital image processor also provides other imaging capabilities including activity detection and text and graphics overlay. In one embodiment, digital image processor 104 includes a GPIO interface and a bitmap overlay output interface.

The overall operation of digital image processor 104 is controlled by system processor 240. In the present embodiment, system processor 240 is implemented as an ARM (Advanced RISC Machine) processor. Firmware for supporting the operation of system processor 240 can be stored in any memory buffer. In the present embodiment, a portion 229 of frame buffer 228 is allocated for storing the firmware used by system processor 240. System processor 240 operates to initialize and supervise the functional blocks of image processor 104. System processor 240 also generates and updates contents of lookup table 230, handles automatic exposure and performs automatic white balance.

Digital image processor 104 includes interface circuit 224 for communicating with digital image sensor 102. Interface circuit 224 includes a SPI bus interface module and a pixel bus interface module. The SPI bus interface module transmits control instructions to control image sensor 102. The SPI bus interface module also operates to load boot codes from an external serial flash memory device after video imaging device 100 has been reset. The pixel bus interface module supports the pixel bus which is a high speed digital communication link between digital image sensor 102 and digital image processor 104. The pixel bus interface module manages the transfer of pixel data from pixel bus 220 and stores the pixel data into frame buffer 228.

In the present embodiment, interface circuit 224 further includes a digital interface (DIF) module 226 which provides write protect function for frame buffer 228. Specifically, when pixel data are transferred from digital image sensor 102, DIF module 226 prevents the writing of the pixel data for a specific pixel location if the pixel data contains a predetermined codeword. In this manner, the value for that pixel location stored in frame buffer 228 is preserved. The DIF module and the use of special codewords have particular application in performing defective or dead pixel correction and privacy masking. The operation of DIF module 226 in conjunction with lookup table 230 for performing dead pixel correction, privacy masking and other image processing functions, is described in detail in the aforementioned U.S. patent application Ser. No. 10/634,339, entitled "Digital CMOS Image Sensor Incorporating A Programmable Multi-Functional Lookup Table," of David Yang et al.

In brief, when digital image processor 104 is initialized, system processor 240 causes one or more reserved codewords to be stored in frame buffer 228 for pixel locations identified as bad pixels or masked pixels. When pixel data arrives on pixel bus 220, DIF 226 checks the stored content for each pixel in frame buffer 228. If the stored content belongs to one or more of the reserved codewords, then DIF will prevent the writing of pixel data into those pixel locations in frame buffer 228. In this manner, the reserved codewords, indicating a defective pixel or a masked pixel, will be preserved in those pixel locations. When the pixel data are read out of frame buffer 228 for processing, LUT 230 recognizes the reserved codewords indicating defective or masked pixels and directs interpolator module 232 to provide correction. In the case of defective pixel correction, digital image processor 104 can perform interpolation to derive the expected pixel value for the defective pixel location. In the case of a masked pixel, digital image processor 104 can substitute dummy pixel data content for the masked pixels.

Image data stored in frame buffer 228 are read out of the frame buffer through lookup table (LUT) 230 which functions to provide signal processing functions as described in the aforementioned patent application entitled "Digital CMOS Image Sensor Incorporating A Programmable Multi-Functional Lookup Table," of David Yang et al. The image data is then provided to an image pipeline for processing into video data in the desired video format. In the present embodiment, the image pipeline includes interpolator module 232 for providing demosaicing and image scaling functions and image processing block 234 for providing image enhancement functions. The image enhancement functions can include edge and sharpness enhancement, color fidelity, contrast enhancement, backlight compensation and dynamic range enhancement. Processed image data from the image pipeline are provided to TV encoder 236 for formatting into a digital video stream in the selected video format.

In the present embodiment, frame buffer 228 stores pixel data still in the "mosaic domain"—that is each pixel is associated with a single pixel value indicative of the pixel intensity value for the pixel captured through a selective transmissive color filter. The image pipeline in digital image processor 104 provides the following pixel processing functions. First, interpolator module 232 performs vertical scaling and demosaicing. Specifically, interpolator module 232 performs interpolation to determine the missing chroma components for each pixel so that each pixel is represented by a set of pixel data in three primary colors. Interpolator module 232 also performs vertical scaling to match the pixel data to the vertical resolution of the selected video format (that is, the selected television display standard). Interpolator module 232 also scales the image data horizontally if need to match the horizontal resolution of the selected video format. In the present embodiment, interpolator module 232 implements a five-tap horizontal interpolator and a nine-tap vertical interpolator. Interpolator module 232 also includes a real-time coefficient generator for generating the coefficients for the vertical and horizontal interpolators. Lastly, interpolator module 232 includes nine line buffers for processing nine rows of pixel data at the same time.

In the present embodiment, the image pipeline is formed as a hard-wired signal processing pipeline. In other embodiments, the functions of the image pipeline can be implemented using a digital signal processor (DSP) programmed to perform the various image processing functions. The advantages of using a hard-wired signal processing pipeline include faster processing speed and reduced power consumption.

Image processing block 234 provides tone correction functions. In one embodiment, a tone correction method using a blending mask is applied. The use of blending mask to provide tone correction will be described in more detail below. Image processing block 234 also includes functional blocks for applying color space conversion and non-linear image enhancement filters.

Finally, TV encoder 236 generates the video data stream in the form of video signals in the desired video format and color space. TV encoder 236 supports NTSC or PAL video formats and is configurable to support other video formats, including digital video format.

Image Capture Operation

The image capture operation of video imaging system 100 is as follows. When video imaging system 100 is initiated, system processor 240 loads microcodes into memory 215 in digital image sensor 102. The microcodes may be updated by system processor 240 upon subsequent image captures and histogram data analysis.

An image capture operation starts when digital image sensor 102 is reset and system processor 240 transfers capture information to digital image sensor 102 via SPI bus 222. Digital image processor 104 initiates an image capture by sending a control code on SPI bus 222. Digital image sensor 102 performs an image capture based on the capture information provided by digital image processor 104. Digital image sensor 102 indicates completion of an image capture by sending a control code on SPI bus 222. Then, digital image processor 104 initiates image data transfer by sending another control code through SPI bus 222. When image data transfer is initiated, SIMD engine 216 performs CDS subtraction and Gray code to binary conversion. Then pixel data are transferred through interface circuit 218 at a rate of 2 pixels per clock cycle. In one embodiment, the clock cycle runs at a 200 MHz frequency. When a frame of pixel data has been completely transferred, digital image sensor 102 indicates transfer completion by sending a control code on SPI bus 222. Then, depending on the system settings, digital image sensor 102 can initiate the next image capture immediately upon completion of the last image capture or digital image sensor 102 can wait for further control instructions from digital image processor 104.

Thus, in accordance with the present invention, the digital image sensor of the video imaging system does not receive timing information from the digital signal processor but rather operates in response to a protocol for delivering full frame of image data on demand. Thus, the digital image sensor of the video imaging system can operate autonomously during image capture and interacts with the digital image processor only for transferring a full frame of pixel data.

Noise Reduction Circuit in Image Processor

Image data measured by a digital imaging system are generally plagued by additive random noise, such as readout noise, having the effect of limiting the resolution of the digital imaging system. Readout noise refers to the category of noise generated due to the readout process of the pixel intensity values and includes noise associated with quantization during the analog-to-digital conversion process. Additive random noise is particularly problematic at low light conditions where such additive random noise can become more visible. Prior attempts to improve the signal to noise ratio of the image data involve the use of long integration time. However, using a long integration time is not always practical because leakage current that exists in the pixels may actually reduce the effective signal level. To make matter worse, leakage current increases at higher operating temperate. Thus, it is often not practical to use a long integration time for noise reduction as it may actually have the opposite effect of reducing the intended signal strength.

According to another aspect of the present invention, digital image processor 104 includes a noise reduction circuit for reducing additive random noise that may exist in the pixel data captured by a digital image sensor. The noise reduction circuit of the present invention implements an infinite impulse response (IIR) filter and multiple sampling to increase the signal to noise ratio of the pixel data, particularly for low light image capture. The noise reduction circuit of the present invention is programmable and therefore can be made to accommodate a wide variety of noise conditions. For example, the coefficients for the IIR filtering operations (referred below as the blending coefficients) or the number of samples to use in the multiple sampling operations can be selected to give the optimal signal-to-noise ratio.

In accordance with one embodiment of the present invention, video imaging system 100 includes an interface circuit that supports noise filtering and multiple sampling operations for noise reduction. Specifically, in the present embodiment, the interface circuit in the digital image processor includes an alpha blender circuit operating to provide noise filtering functions. By incorporating noise reduction functions directly at the interface circuit, the pixel data can be preprocessed as they are being read out from the digital image sensor, maintaining efficiency of pixel data transfer while improving the signal-to-noise ratio.

The alpha blender circuit incorporates several noise reduction functions which can be selected based on user input or by the system processor. First, the alpha blender circuit performs digital integration. Digital integration can be performed by reading and storing multiple frames of images and then averaging the pixel values of the frames using an accumulation buffer. Digital integration can be implemented by providing a separate frame buffer for storing pixel data for each capture and then summing the pixel data during video processing. However, providing a separate frame buffer can be very expensive in implementation. In accordance with one embodiment of the present invention, digital integration is implemented using an infinite impulse response (IIR) filter and the integration time is controlled using a blending coefficient "$\alpha$".

Second, the alpha blender circuit implements a multi-sample averaging scheme using an amplitude and time dependent blending coefficient "$\alpha$". The multisample averaging scheme is particularly suited for reducing readout noise. A description of the readout noise problem afflicting image sensor readout and suggested solution is provided in a paper entitled "Photocurrent estimation from multiple non-destructive samples in CMOS image sensors" by Xinqiao Liu and Abbas El Gamal, Proceedings of the SPIE Electronic Imaging 2001 Conference, vol 4306, San Jose, Calif. (January, 2001), which reference is incorporated herein by reference in its entirety. In principle, the multisample averaging scheme uses an amplitude and time dependent '$\alpha$' which represents the current integration time and the confidence level in the accuracy of the measurement.

Figure 5:
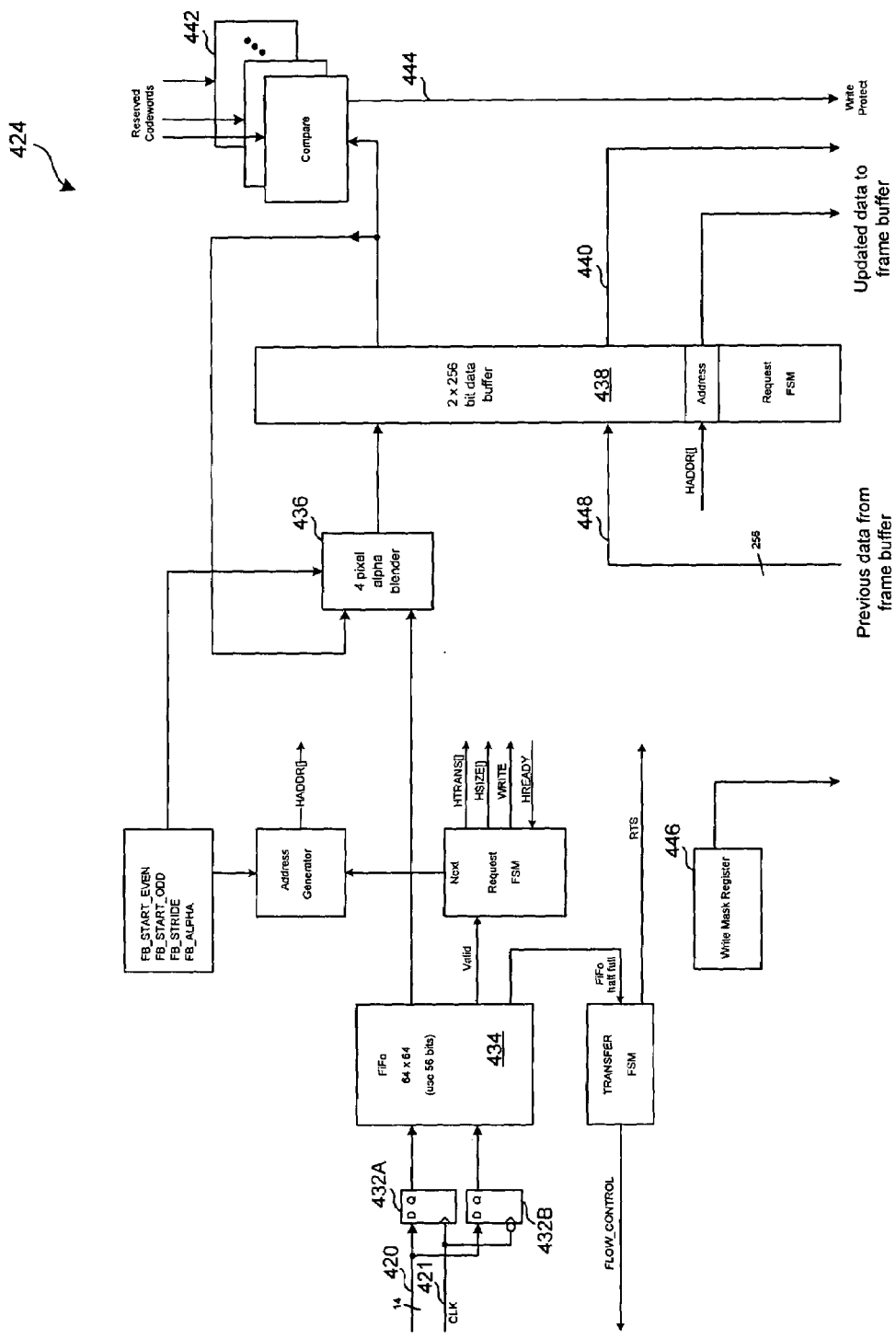
FIG. 5 is a block diagram of an interface circuit according to one embodiment of the present invention.

FIG. 5 is a block diagram of an interface circuit according to one embodiment of the present invention which interface circuit can be used to implement interface circuit 224 in video imaging system 100 of the present invention. Referring to FIG. 5, interface circuit 424 includes D-flip-flops 432A and 432B receiving pixel data on pixel bus 420. In the present embodiment, D-flip-flops 432A and 432B are operated on different phases of the same clock signal on bus 421 and therefore the D-flip-flops operate to read pixel data alternately from pixel bus 420. In this manner, interface circuit 424 can read the pixel data arriving on pixel 420 that is transmitted at a double data rate. Pixel data are stored in a first-in-first-out (FIFO) memory 434. From FIFO 434, the pixel data are transferred through alpha blender circuit 436 for noise processing before being stored in a data buffer 438. Pixel data stored in data buffer 438 are read out of interface circuit 424 on a data bus 440 to be stored in a frame buffer, such as frame buffer 228 of FIG. 1. In the present embodiment, alpha blender circuit 436 is a 4 pixel alpha blender circuit.

FIG. 5 also illustrates the implementation of digital interface circuit 226 of FIG. 1. When pixel data for a specific pixel location is received on pixel bus 420, the pixel data already stored in the frame buffer are read back into interface circuit 424 on a data bus 448. The stored pixel data is compared with one or more reserved codewords using one or more comparators 442. If a match is identified, a write protect signal (on bus 444) is asserted for that pixel location and the pixel data received on pixel bus 420 will not be written into the frame buffer. In interface circuit 424, a write mask register 446 is included to control the write protection of n out of k bits of pixel data where n can be any number equal to or less than k. In this manner, the digital interface circuit can be used to protect certain bits of the pixel data so that correction factors, such as CDS subtract values, will not be overwritten. Accordingly, when the write protect signal is asserted for a specific pixel location, write mask register 446 indicates how many bits of the pixel data are to be write protected.

Figure 6:
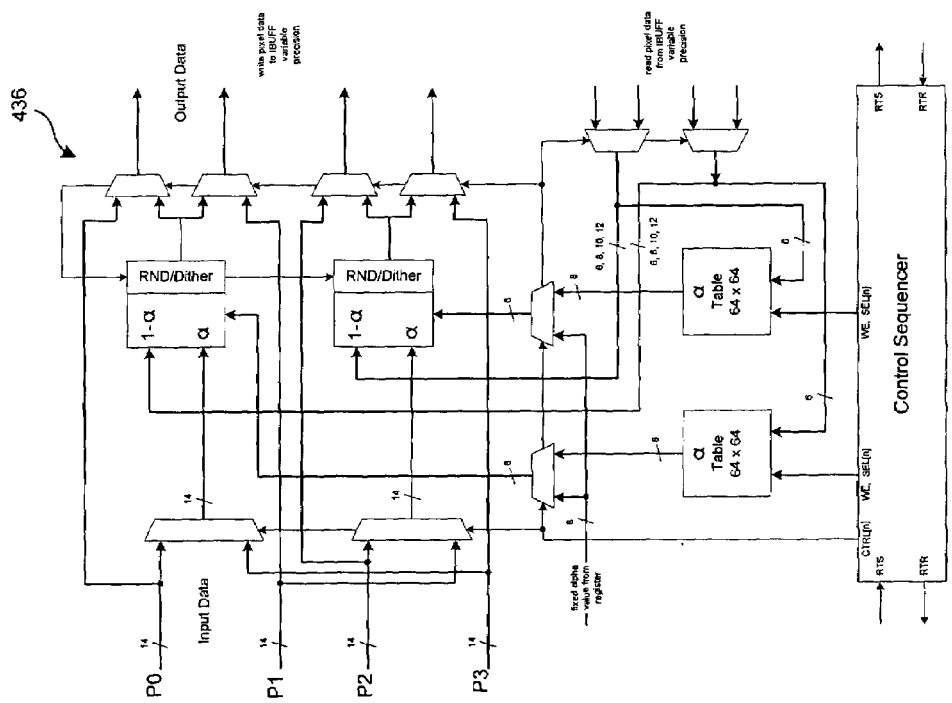
FIG. 6 illustrates a four-pixel alpha blender circuit according to one embodiment of the present invention.

FIG. 6 illustrates a four-pixel alpha blender circuit according to one embodiment of the present invention. Referring to FIG. 6, alpha blender circuit 436 handles the processing of four pixels P0 to P3 at the same time. In the present embodiment, alpha blender circuit 436 includes three operation modes: a direct storage mode, an IIR filter mode and a multisample averaging mode.

Figure 7:
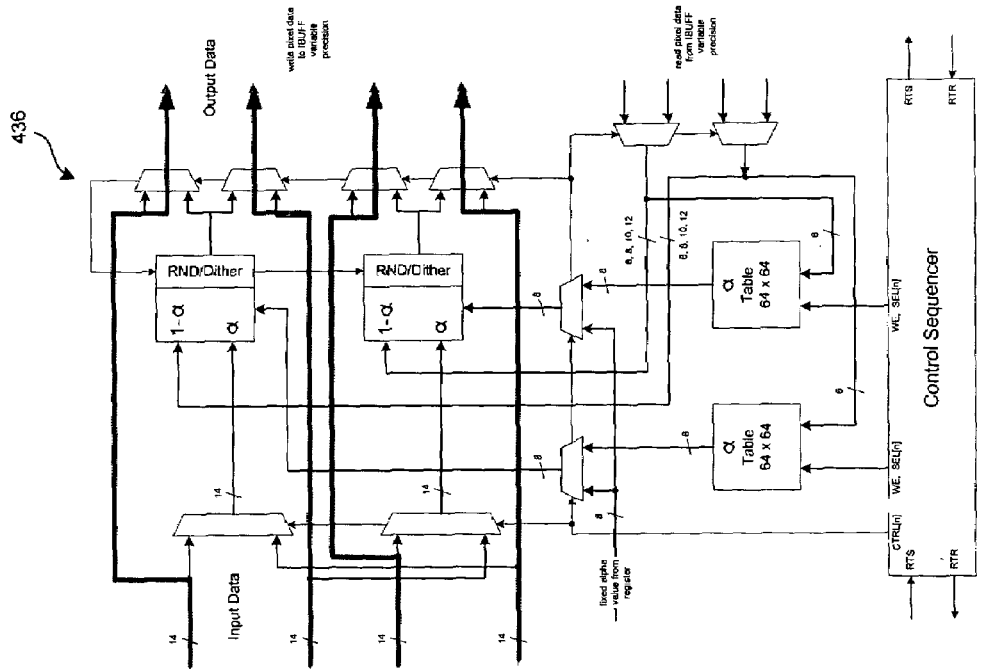
FIG. 7 illustrates the data path of the four pixels when the alpha blender circuit of FIG. 6 is operated in the direct storage mode.

The first mode is a direct storage mode whereby pixel data from the digital image sensor on bus 420 are stored directly in the frame buffer. Thus, in the direct storage mode, no noise reduction operation is performed. The direct storage mode is optional and is included where it is necessary to bypass noise reduction functions. FIG. 7 illustrates the data path of the four pixels when alpha blender circuit 436 is operated in the direct storage mode. In the direct storage mode, input pixel data from FIFO 434 are coupled to a bypass data path and are provided directly to the output of the alpha blender circuit.

The second operation mode is referred to as the "IIR filter" mode. In the IIR filter mode, alpha blender circuit 436 provides frame averaging function. Thus, the content in the frame buffer is first initialized (that is, emptied) and within an integration time, multiple frames of pixel data are integrated and the pixel data are averaged. The integration time is controlled by using a blending coefficient "$\alpha$". By integrating over a predetermined integration time, the noise content of the pixel data dies out, thereby removing the noise component from the pixel data.

Specifically, during the integration of each frame of pixel data, the pixel data is computed as follows:

New data=α*input data+(1−α)*old data, wherein "new data" represents the final pixel data value, "input data" represents the pixel data from the current frame of pixel data and "old data" represents the pixel data previously averaged. In the IIR filter mode, the blending coefficient "α" is a fixed value provided to the alpha blender for use in the IIR filtering operation.

Figure 8:
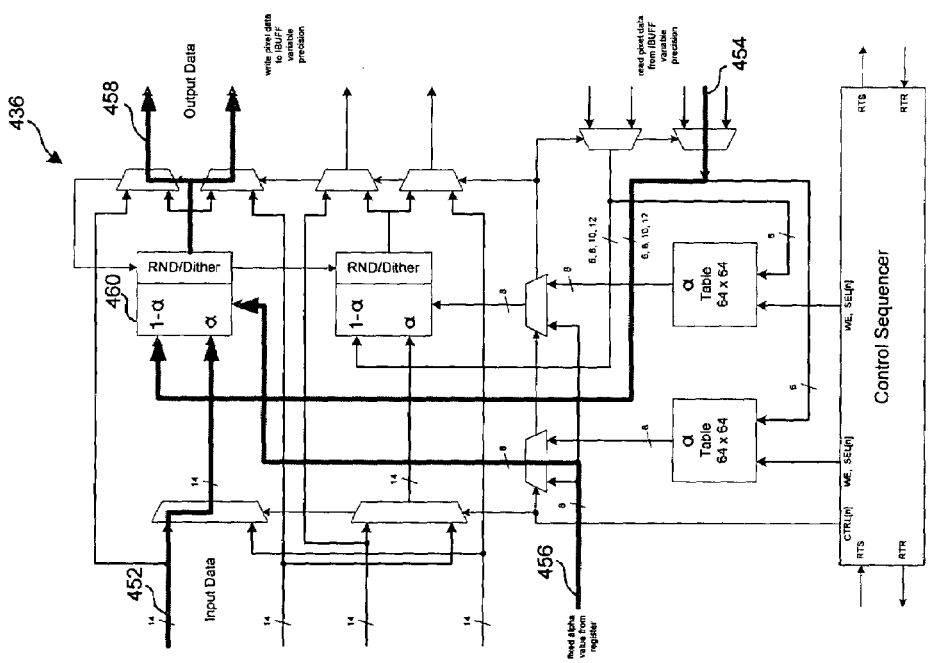
FIG. 8 illustrates the data path of the pixel data when alpha blender circuit of FIG. 6 is operated in the IIR filter mode.

FIG. 8 illustrates the data path of the pixel data when alpha blender circuit 436 is operated in the IIR filter mode. Specifically, input pixel data (input data) arrives on bus 452 and is coupled to a multiplier-accumulator circuit 460 to be multiplied by the factor α. The old data arrives from the frame buffer on bus 454 and are coupled to a multiplier-accumulator circuit 460 to be multiplied by the factor (1−α). The multiplied values are summed and provided to output bus 458 to be written back to the frame buffer. In the IIR filter mode, the α value is a fixed value provided to alpha blender circuit 436 via bus 456.

The third operation mode incorporated in alpha blender circuit 436 is multisample averaging. In the multisample averaging operation mode, multiple sampling is practiced by reading the same data from the digital image sensor multiple times, for example, three data reads in a row, and averaging the pixel data from the multiple readouts. When the same pixel data is being read out multiple times, the random readout noise will be averaged out. The alpha blender circuit uses a data dependent blending coefficient "α" where α is a function of the pixel data already averaged ("the old data") and the exposure time. The blending coefficient "α" is thus used as a weighing factor indicating the confidence level of the averaged pixel data.

Specifically, during the integration of each frame of pixel data, the pixel data is computed as follows:

New data=α*input data+(1−α)*old data, wherein "new data" represents the final pixel data value, "input data" represents the pixel data from the current frame of pixel data, "old data" represents the pixel data previously averaged, and α is a function of the previous data value and exposure time. Thus, the old data and the exposure time are used to look up the "α" value to be used for the current averaging operation. The blending coefficient α can be made to be a function of either the old data, or the exposure time or both. Also, the blending coefficient α can also be made a function of the number of iterations as opposed to the number of exposure times. Basically, if the pixel data value is large, then the alpha blender circuit has large confidence in the data and an α value can be choose to stop further data accumulation to avoid saturating the pixel value.

When interface circuit 424 is operating in the multisample averaging mode, two frame buffers are needed where one frame buffer stores the assembled image being displayed and another frame buffer is used to assemble the next image. In the present embodiment, the frame buffer of the digital image processor can be divided into half to provide two frame buffers. For example, a 12-bit frame buffer can be split into two 6-bit wide frame buffers. Thus, one half of the frame buffer is used for storing the image being displayed and the other half used for accumulation of a new image. In the present implementation, alpha blender circuit 436 is capable of handling variable bit-width data so that either pixel data in the full width or in half width can be processed through the alpha blender circuit.

Figure 9:
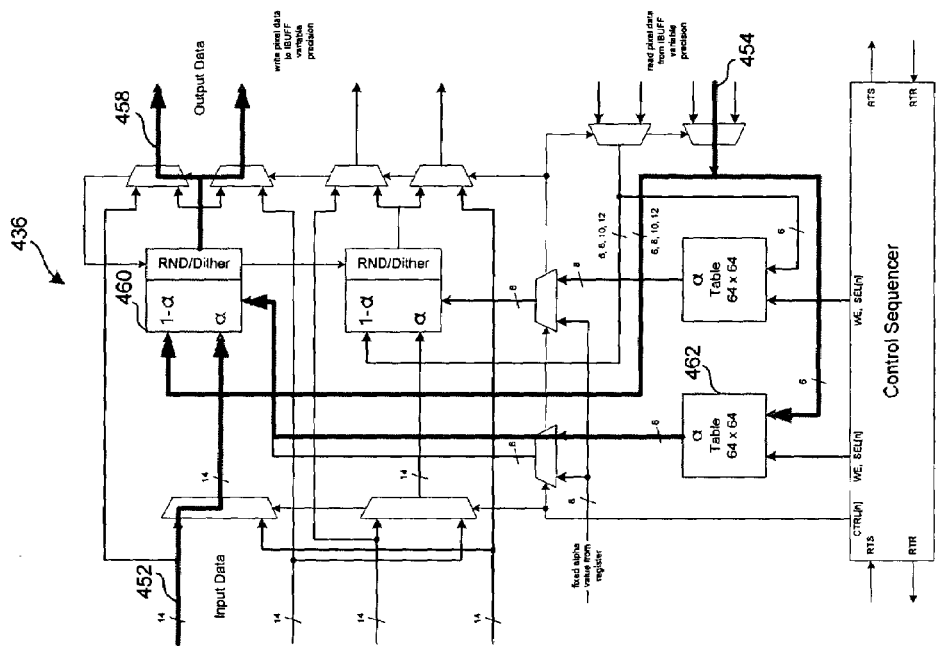
FIG. 9 illustrates the data path of the pixel data when the alpha blender circuit of FIG. 6 is operated in the multisample averaging mode.

FIG. 9 illustrates the data path of the pixel data when alpha blender circuit 436 is operated in the multisample averaging mode. Specifically, input pixel data (input data) arrives on bus 452 and is coupled to multiplier-accumulator circuit 460 to be multiplied by the factor α. The old data arrives from the frame buffer on bus 454 and are also coupled to a multiplier-accumulator circuit 460 to be multiplied by the factor (1−α). However, the old data is also coupled to a α lookup table 462 where the old data and/or the exposure time is used to index the table to provide a data dependent α value. The data dependent α value is then provided to multiplier-accumulator circuit 460. The multiplied pixel values are summed and provided to output bus 458 to be written back to the frame buffer. In this manner, multisample averaging is realized and a data dependent α value is used to provide optimal noise reduction.

When interface circuit 424 incorporates alpha blender 436 for providing noise reduction functions, memory traffic is necessarily increased as the frame buffer has to be repeatedly accessed to retrieve the old data and to store the newly averaged data. In one embodiment of the present invention, the frame buffer implements linked address processing to reduce the amount of memory traffic.

In one embodiment, the frame buffer is organized in 256 bits wide access units (words). Thus, each access unit in the frame buffer can store 21 pixels, each 12 bits wide, leaving 4 bits of unused space. The 4 bits are used as links. Each horizontal line in the image will consist of a linear sequence of access units. In the current embodiment, a horizontal line encompasses 720 pixels, thus requiring 35 access units. For each line, a chain of access units is established by linking a sequence of access units using the 4 bit links. The chain consists of access units that either contain defective pixels or if two access units that contain defective pixels are further apart than 15 addresses an intermediate link is created by using another access unit as an intermediate link. Thus a link from first access unit with a defective pixel will point to the intermediate access unit and the link of that access unit will either directly point to the next access unit with a defective pixel or if the distance is still greater than 15 addresses another intermediate access unit will be required to reach the next access unit with a defective pixel. If no access units containing defective pixels are located in the horizontal line after the last access unit, the link in that last access unit is set to a reserved value as an indication for the end of chain. In a preferred implementation 4 bits of zero will be used to indicate the end of chain condition. By using link address processing, a memory read cycle is eliminated for access units that do not contain defective pixels and memory traffic is accordingly reduced.

Multiple Tone Correction Using Blending Mask

As described above, when video imaging system 100 of the present invention is implemented as a digital pixel sensor, the video imaging system is capable of achieving an image with very high dynamic range. However, rendering this high dynamic image to a display can be challenging. Because the display typically has a limited displayable contrast range, the brightness range of a high dynamic range image may have to be compressed and the image appeared flat and lack of contrast. The high dynamic range image can also be rendered so that either the bright areas lack detail or the dark areas lack detail.

Figure 10:
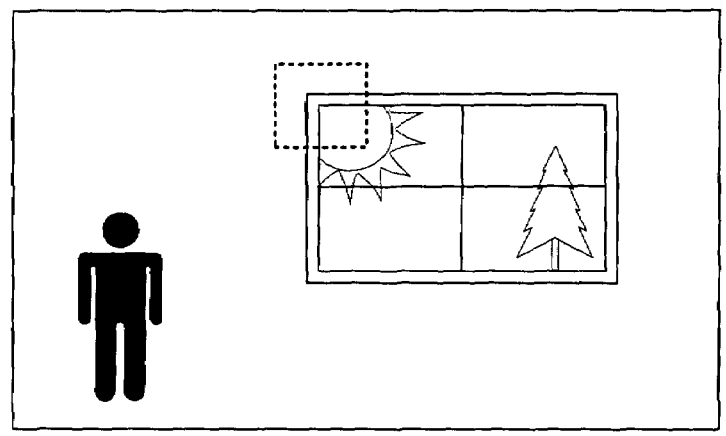
FIG. 10 is an exemplary image of a scene.

Another problem encountered in rendering high dynamic range images is that different areas of a scene, especially those with vastly different intensity of illumination, are receiving light from different illumination sources. For example, as shown in the illustrative image in FIG. 10, a scene that includes a window may contain areas that are lit by incandescent or fluorescent light and areas that are lit by the sun. When the image is rendered on a display, different types and intensities of light require different tone correction curves so that the image can be rendered correctly. For example, light from different light source, light with different color temperatures or light having different spectral gaps/bands would require specific tone correction curves to provide proper color reproduction. Therefore, it is desirable to be able to identify different regions of the image of a scene and generate the appropriate tone correction curves for each region.

In accordance with another aspect of the present invention, a method for providing tone correction employs a blending mask to compute a "selector value" for each pixel which selector value indicates the use of a specific tone correction curve. The method enables the selection of a tone correction curve that is appropriate for a given area of an image of a scene depending on the type or intensity of light at that particular area. First, the pixels in an image are classified and then a blending mask is applied for each pixel to compute an average weight function for the pixel. The value of the weight function, that is the selector value, is used to select a simple tone correction curve or a complex (or blended) tone correction curve. In this manner, a high contrast and high dynamic range image with areas lit by multiple light sources can be rendered properly on a display. Even when the display has limited contrast ratio display capability, the displayed image can maintain local contrast and color balance for the bright areas and the dark areas.

When the tone correction method of the present invention is applied to video imaging system 100 of the present invention, the tone correction method can be implemented in the image processing circuit 234 of the video image pipeline. Of course, the tone correction method of the present invention can be applied to other digital imaging systems for providing proper tone correction and color rendering.

Figure 11:
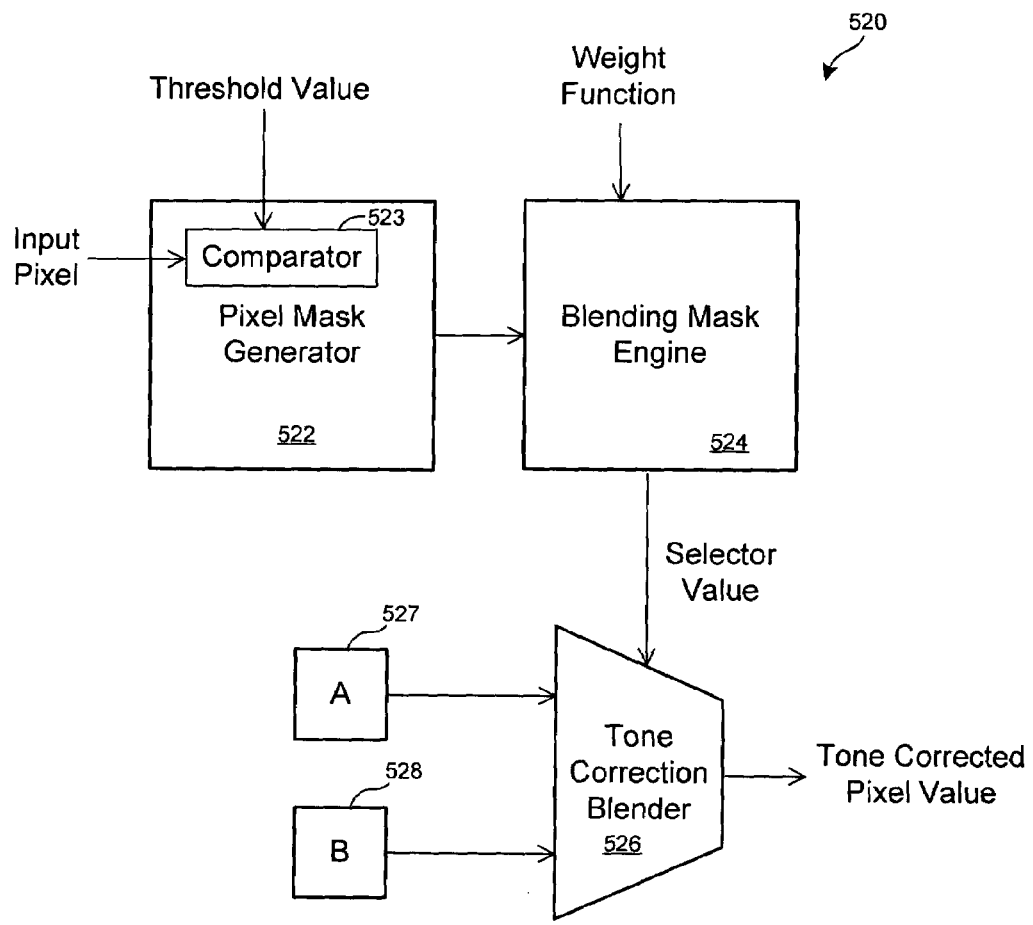
FIG. 11 is a block diagram of a tone correction circuit which can be used to implement the method according to one embodiment of the present invention.
Figure 12:
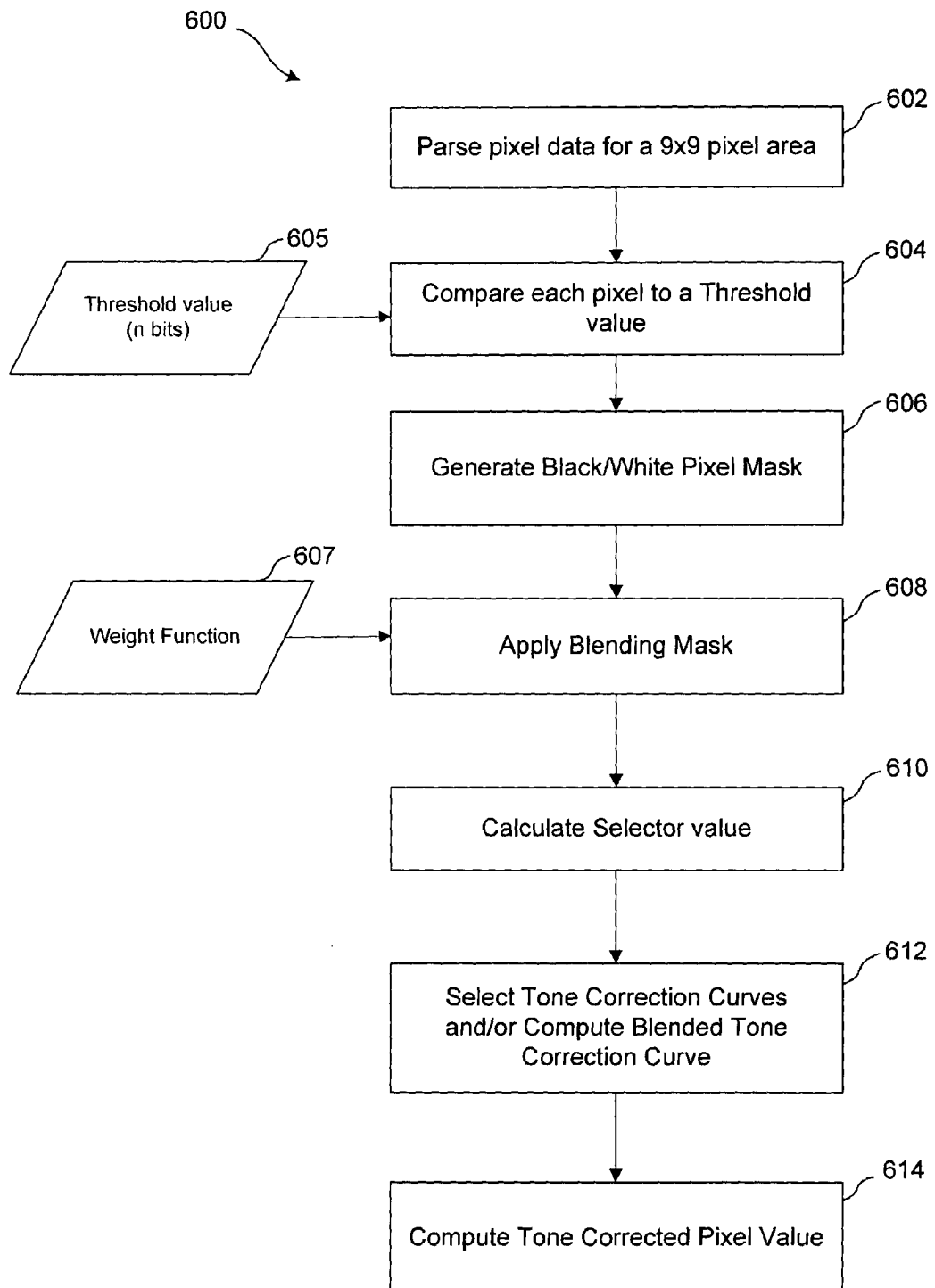
FIG. 12 is a flow chart illustrating the tone correction method using a blending mask according to one embodiment of the present invention.

The tone correction method of the present invention will be described with reference to FIGS. 11 to 14. FIG. 11 is a block diagram of a tone correction circuit which can be used to implement the method according to one embodiment of the present invention. FIG. 12 is a flow chart illustrating the tone correction method using a blending mask according to one embodiment of the present invention.

The tone correction method of the present invention operates to compute tone corrected pixel values for each pixel location in an image based on a m×m neighborhood of pixels surrounding each pixel location. In the present embodiment, a 9×9 neighborhood of pixels are used. As discussed above, the tone correction method of the present invention can be divided into three principle steps. First, the m×m neighborhood of pixel values are classified to define areas illuminated using different light source or to define areas with highly contrast lighting conditions. In this manner, a pixel mask in the form of a black and white color mapping is generated. Then, a blending mask is applied to the pixel mask and a selector value is calculated. Finally, the selector value is used to select a desired tone correction curve to be applied to the pixel.

Referring to FIG. 12, tone correction method 600 of the present invention starts by parsing pixel data values for a 9×9 neighborhood of pixels surrounding the current pixel being processed (step 602). Then, the pixels in the 9×9 neighborhood of pixels are classified according to a threshold value. In the present embodiment, the pixel classification is done to separate pixels illuminated by outdoor light versus indoor light. A assumption is made that the outside light is much brighter than the inside light. Thus, a threshold value is selected to distinguish between large pixel intensity values and small pixel intensity values.

In accordance with the present embodiment, the pixel values of the 9×9 neighborhood of pixels are compared against a threshold value, such as by using a comparator circuit 523 in pixel mask generator 522 (step 604). Pixel values that are greater than the threshold value are given a value of 0 and pixel values that are small or equal to the threshold value are given a value of 1. In this manner, a black and white pixel mask for the 9×9 neighborhood of pixels is generated where each location of the pixel mask contains a value indicating whether each pixel value is above or below the threshold (step 606).

In the present embodiment, the pixel mask is a 1 bit mask and the pixel mask indicates whether a pixel intensity value is greater than or less than a predefined light intensity value as the threshold value. In other embodiments, the pixel mask can be an n-bit mask and a set of threshold values is selected to classify the pixels according to various factors. In one embodiment, the threshold values include a predefined light intensity value to be compared with the pixel value or an estimated luminance value of the 9×9 neighborhood of pixels. The threshold values can also include a predefined gradient value to be compared with a local gradient value derived from the pixel value. Finally, a bit scalar or bit vectored cost function can be calculated for a pixel based on any local spatial, intensity or other properties. The bit scalar or bit vectored cost function can be compared with a predefined threshold value to classify the pixel.

Figures 13, 14:
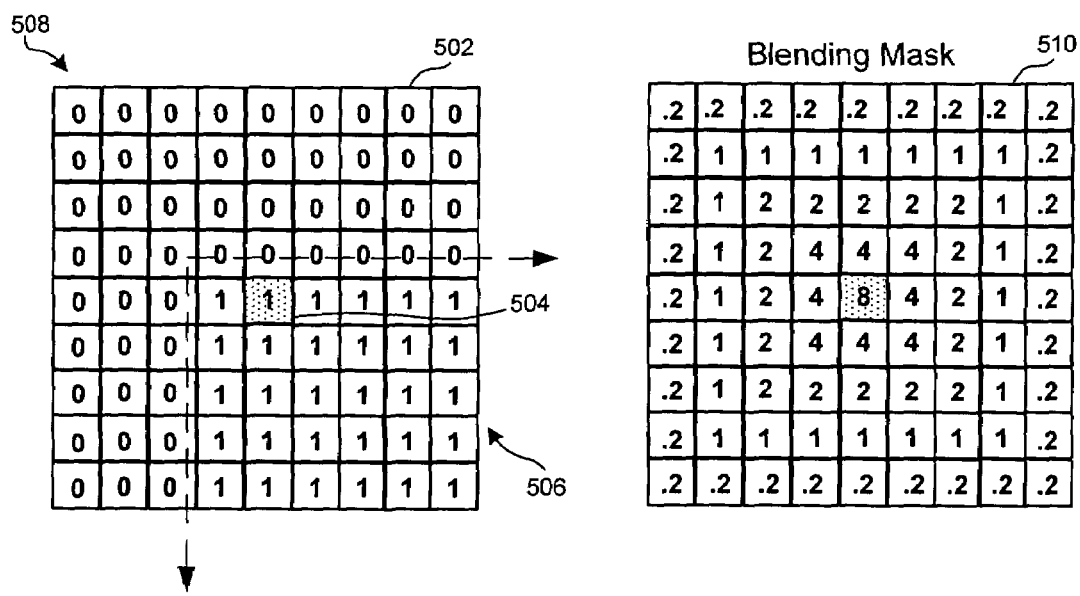
FIG. 13 is an exemplary pixel mask generated by the pixel mask generator in the tone correction circuit of FIG. 11.
FIG. 14 illustrates a blending mask which can be used in the tone correction method according to one embodiment of the present invention.

Pixel Mask generator 522 generates a black and white pixel mask classifying the pixel values within the 9×9 neighborhood of pixels. FIG. 13 is a exemplary pixel mask generated by pixel mask generator 522. In the present illustration, the current pixel being processed is a pixel near the frame of the window. Thus, the 9×9 neighborhood of pixels straddles the bright area within the window and the darker area outside the window as indicated by box 488. Referring the FIG. 13, a pixel mask 502 is generated for a center pixel 504 representing the current pixel being processed. A dashed-arrowed line represents the boundary of the window. Pixels outside the window boundary (area 508) have lower pixel intensity values (darker) and are classified with a "0" pixel mask value. The pixels inside the window boundary (area 506) have higher pixel intensity values (brighter) and are classified with a "1" pixel mask value. In this manner, pixel mask 502 is generated defining a bright light area and a dim light area.

While the pixel mask defines outside light area and inside light area, it is not practical to simply apply tone correction using the pixel mask as abrupt changes in color temperature from one pixel to another pixel may result. In accordance with the present invention, the pixel mask is coupled to a mask blending engine 524 which operates to apply a blending mask to the pixel mask (step 608). The blending mask is applied to ensure that the transitions between bright light and low light areas are smooth. Thus, the blending mask operates to blur the pixel mask by employing a weight function. Specifically, the weight function can be implemented as a two dimensional low pass filter, a Gaussian filter or any other filter that replaces a step function by a continuous slope.

FIG. 14 illustrates a blending mask which can be used in tone correction method 600 according to one embodiment of the present invention. In the present embodiment, blending mask 510 implements a two dimensional Gaussian filter. Specifically, a large weight factor is assigned to the center pixel and the values of the weight factors decrease for pixels with increasing distance from the center pixel. Thus, in the present illustration, the center pixel has a weight factor of 8. The pixels in a ring surrounding the center pixel are assigned a weight factor of 4. The pixels in the next rings are assigned a decreasing weight factor of 2, 1 and 0.2. As a result, a gradual change in the weight factor is created from the inner ring to the outer ring of the 9×9 neighborhood of pixels.

The blending mask, such as mask 510, is applied to pixel mask 502 generated by pixel mask generator 522 for the current pixel in step 606 and a selector value is calculated (step 610). Essentially, the selector value is a weighted sum of multiple transfer functions applied to each pixel. The selector value is calculated as follows: for each ring of pixels in the 9×9 neighborhood of pixels, the number of ones is counted and the weight factor for that ring is multiplied by the number of ones. The products for each ring are summed to obtain the selector value for the current pixel. The selector value "p" can be expressed as:

$$p = w_1 * a[p_{in}(x,y)] + w_2 * b[p_{in}(x,y)] \ldots + w_n * t_n[p_{in}(x,y)]$$

where n can be any reasonable number, $t_n$ represents a transfer function (e.g. log or exp) and can be implemented by a lookup table, by linear interpolation or by piecewise linear function segments.

By applying the blending mask with weight functions, a selector value is computed which can be used to select the desired tone correction curves (step 612). Referring to FIG. 11, the selector value is coupled to a tone correction blender 526. Tone correction blender 526 receives one or more tone correction curves which are represented as curve A (block 527) and curve B (block 528) in the present embodiment. Curve A can represent a tone correction curve for outside lighting condition and curve B can represent a tone correction curve for indoor lighting condition. Tone correction blender 526 uses the selector value to selected either one of the tone correction curves or a complex tone correction curve by blending a selected number of tone correction curves. That is, the selector value can be used to generate a complex tone correction curve by weighting tone correction curves A and B and blending the weighted curves. The selected tone correction curve or the computed complex tone correction curve is then applied to the current pixel value to compute a tone corrected pixel value (step 614).

Tone correction method 600 is applied throughout an image by moving the m×m neighborhood of pixels across the image so that each pixel is processed and tone correction is applied. By using the tone correction method of the present invention, instead of getting an abrupt change in color temperature at the boundaries of high contrast areas, a gradual change is achieved and undesirable artifacts are eliminated.

In the above descriptions, an m×m neighborhood of pixels is used to generate the pixel mask and provide tone correction. The m×m neighborhood of pixels is illustrative only and in other embodiments, other forms of neighborhood of pixels can be used, such as an m×n neighborhood of pixels.

The above detailed descriptions are provided to illustrate specific embodiments of the present invention and are not intended to be limiting. Numerous modifications and variations within the scope of the present invention are possible. The present invention is defined by the appended claims.

We claim:

1. A digital imaging system, comprising:
   an image sensor comprising a two-dimensional array of pixel elements, said image sensor outputting digital signals as pixel data representing an image of a scene;
   a frame buffer, in communication with said image sensor, coupled to store said pixel data provided by said image sensor; and
   a tone correction circuit coupled to receive pixel data from said frame buffer and compute tone corrected pixel data using one or more tone correction curves,
   wherein said tone correction circuit computes tone corrected pixel data for a first pixel by generating a pixel mask for an m×n neighborhood of pixels surrounding said first pixel, the pixel mask classifying the m×n neighborhood of pixels to a first value and a second value according to one or more threshold values, applying a blending mask of weight factors to said pixel mask and computing a selector value based on said pixel mask and weight factors associated with said blending mask, said selector value being used to derive a first tone correction curve for use to compute said tone corrected pixel data for said first pixel; and
   wherein the selector value is computed by counting the number of first values in the pixel mask corresponding to a respective weight factor in the blending mask, multiplying each count value by the respective weight factor, and summing the count-weight factor products to obtain the selector value.

2. The digital imaging system of claim 1, wherein said first tone correction curve comprises a selected one of said one or more tone correction curves.

3. The digital imaging system of claim 1, wherein said first tone correction curve comprises a complex tone correction curve derived by blending a first one and a second one of said one or more tone correction curves based on said selector value.

4. The digital imaging system of claim 1, wherein said one or more tone correction curves comprise a first tone correction curve for outdoor lighting condition and a second tone correction curve for indoor lighting condition.

5. The digital imaging system of claim 1, wherein said pixel mask is generated by comparing pixel data for each pixel in said m×n neighborhood of pixels with a threshold value, said pixel mask assigning a first value of logical "1" to a pixel when the pixel data of said pixel is less than said threshold value and assigning a second value of logical "0" to a pixel when the pixel data of said pixel is greater than said threshold value.

6. The digital imaging system of claim 1, wherein said blending mask implements a two dimensional low pass filter, a Gaussian filter or any other filter that replaces a step function by a continuous slope.

7. The digital imaging system of claim 1, wherein said m×n neighborhood of pixels comprises a m×m neighborhood of pixels.

8. A method for providing tone correction to an image, comprising:
   generating digital pixel data representative of an image of a scene using an image sensor, said image sensor comprising a two-dimensional array of pixel elements;
   storing said digital pixel data in a frame buffer;
   for a first pixel in said image, selecting an m×n neighborhood of pixels surrounding said first pixel;
   generating a pixel mask for said m×n neighborhood of pixels, said pixel mask including a first value to indicate a pixel in said m×n neighborhood of pixels having a pixel value greater than a threshold value and said pixel mask including a second value to indicate a pixel in said m×n neighborhood of pixels having a pixel value smaller than said threshold value;

providing a blending mask including weight factors;

applying said blending mask to said pixel mask;

computing a selector value based on said pixel mask and weight factors associated with said blending mask, wherein computing the selector value comprises: counting the number of first values in the pixel mask corresponding to a respective weight factor in the blending mask, multiplying each count value by the respective weight factor, and summing the count-weight factor products to obtain the selector value;

providing a plurality of tone correction curves; and deriving a first tone correction curve from said plurality of tone correction curves based on said selector value for use to compute said tone corrected pixel data for said first pixel.

9. The method of claim 8, wherein said deriving said first tone correction curve comprises selecting a tone correction curve from said plurality of tone correction curves.

10. The method of claim 8, wherein said deriving said first tone correction curve comprises blending a first one and a second one of said plurality of tone correction curves based on said selector value.

11. The method of claim 8, wherein said plurality of tone correction curves comprise a first tone correction curve for outdoor lighting condition and a second tone correction curve for indoor lighting condition.

12. The method of claim 8, wherein said generating a pixel mask for said m×n neighborhood of pixels comprises:

for each pixel is said m×n neighborhood of pixels, comparing the pixel data associated with each pixel to said threshold value;

assigning said first value being a logical "1" to a pixel when the pixel data of said pixel is less than said threshold value; and assigning said second value being a logical "0" to a pixel when the pixel data of said pixel is greater than said threshold value.

13. The method of claim 8, wherein said blending mask implements a two dimensional low pass filter, a Gaussian filter or any other filter that replaces a step function by a continuous slope.

14. The method of claim 8, wherein said m×n neighborhood of pixels comprises a m×m neighborhood of pixels.

* * * * *